(12) United States Patent
Krishtul

(10) Patent No.: US 10,076,788 B2
(45) Date of Patent: Sep. 18, 2018

(54) CUTTING INSERT WITH CHIP-CONTROL ARRANGEMENT

(71) Applicant: Iscar, Ltd., Tefen (IL)

(72) Inventor: Roman Krishtul, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 168 days.

(21) Appl. No.: 14/282,214

(22) Filed: May 20, 2014

(65) Prior Publication Data

US 2015/0336175 A1 Nov. 26, 2015

(51) Int. Cl.
*B23B 27/00* (2006.01)
*B23B 27/14* (2006.01)

(52) U.S. Cl.
CPC .......... *B23B 27/005* (2013.01); *B23B 27/143* (2013.01); *B23B 2200/0447* (2013.01); *B23B 2200/081* (2013.01); *B23B 2200/286* (2013.01); *B23B 2200/321* (2013.01); *Y10T 407/24* (2015.01); *Y10T 407/245* (2015.01)

(58) Field of Classification Search
CPC ............... Y10T 407/24; Y10T 407/235; Y10T 407/245; B23B 27/22; B23B 27/143; B23B 27/1607; B23B 27/1618; B23B 27/1648; B23B 2200/32; B23B 2200/321
See application file for complete search history.

(56) References Cited

U.S. PATENT DOCUMENTS

| | | | | |
|---|---|---|---|---|
| 4,344,725 A | * | 8/1982 | Seidel | B23B 27/143 407/114 |
| 4,359,300 A | * | 11/1982 | Hazra | B23B 27/143 407/114 |
| 4,880,338 A | | 11/1989 | Stashko | |
| 4,941,780 A | | 7/1990 | Takahashi | |
| 5,032,049 A | | 7/1991 | Hessman et al. | |
| 5,044,839 A | * | 9/1991 | Takahashi | B23B 27/143 407/114 |
| 5,044,840 A | * | 9/1991 | Fouquer | B23B 27/143 407/113 |

(Continued)

FOREIGN PATENT DOCUMENTS

| | | | | |
|---|---|---|---|---|
| DE | 4416651 A1 | * | 12/1994 | ........... B23B 27/045 |
| EP | 318000 A2 | * | 5/1989 | ............. B23B 27/14 |

(Continued)

OTHER PUBLICATIONS

JP 06-190612 Machine Translation, pp. 7-12, Feb. 1, 2018.*
Search report dated Nov. 5, 2015 issued in PCT counterpart application (No. PCT/IL2015/050471).

*Primary Examiner* — Sunil K Singh
*Assistant Examiner* — Nicole N Ramos
(74) *Attorney, Agent, or Firm* — Womble Bond Dickinson (US) LLP

(57) ABSTRACT

A cutting insert has a cutting corner, having a bisector, located on a top surface of the cutting insert. A chip-control arrangement is located at the cutting corner. The chip-control arrangement includes a projection protruding from the top end face and that extends longitudinally in a direction transverse to, and to opposites sides of, the bisector. The chip-control arrangement also includes a protrusion protruding from the top end face and comprising a protrusion ridge that extends from the projection towards a corner cutting edge at the cutting corner.

21 Claims, 3 Drawing Sheets

(56) References Cited

U.S. PATENT DOCUMENTS

| | | | |
|---|---|---|---|
| 5,122,017 A | 6/1992 | Niebauer | |
| 5,147,159 A | 9/1992 | Lowe et al. | |
| 5,192,171 A | 3/1993 | Ther et al. | |
| 5,193,947 A | 3/1993 | Bernadic et al. | |
| 5,230,591 A | 7/1993 | Katbi et al. | |
| 5,282,703 A | 2/1994 | Itaba et al. | |
| 5,476,346 A | 12/1995 | Lundström | |
| 5,577,867 A * | 11/1996 | Paya | B23B 27/141 407/114 |
| 5,628,590 A | 5/1997 | Beeghley et al. | |
| 5,725,334 A * | 3/1998 | Paya | B23B 27/045 407/104 |
| 5,743,681 A * | 4/1998 | Wiman | B23B 27/143 407/114 |
| 5,947,651 A * | 9/1999 | Murakami | B23B 27/143 407/114 |
| 6,039,515 A | 3/2000 | Lamberg | |
| 6,065,907 A | 5/2000 | Ghosh et al. | |
| 6,123,488 A | 9/2000 | Kasperik et al. | |
| 6,234,726 B1 * | 5/2001 | Okada | B23B 27/143 407/114 |
| 7,182,555 B2 | 2/2007 | Kitagawa et al. | |
| 7,909,546 B2 * | 3/2011 | Nada | B23B 27/065 407/113 |
| 7,934,891 B2 * | 5/2011 | Jonsson | B23B 27/10 407/114 |
| 7,976,251 B2 * | 7/2011 | Iyori | B23B 27/143 407/113 |
| 8,251,618 B2 * | 8/2012 | Kobayashi | B23B 27/143 407/114 |
| 8,342,779 B2 * | 1/2013 | Kobayashi | B23B 27/143 407/113 |
| 8,727,676 B2 * | 5/2014 | Lof | B23B 27/143 407/113 |
| 2005/0019111 A1 | 1/2005 | Kitagawa et al. | |
| 2007/0059110 A1 | 3/2007 | Choi et al. | |
| 2007/0189861 A1 | 8/2007 | Muren et al. | |
| 2010/0266353 A1 | 10/2010 | Zitzlaff et al. | |
| 2010/0329800 A1 * | 12/2010 | Edler | B23B 27/145 407/114 |
| 2011/0033252 A1 * | 2/2011 | Nishida | B23B 27/143 407/114 |
| 2011/0070040 A1 * | 3/2011 | Park | B23B 27/143 407/113 |
| 2011/0142555 A1 * | 6/2011 | Yamazaki | B23B 27/143 407/2 |
| 2011/0222974 A1 | 9/2011 | Park et al. | |
| 2012/0177452 A1 | 7/2012 | Konta | |
| 2013/0094914 A1 * | 4/2013 | Majima | B23B 27/143 407/114 |
| 2013/0129432 A1 * | 5/2013 | Jaeger | B23C 5/207 407/42 |
| 2013/0236257 A1 * | 9/2013 | Nada | B23B 27/143 407/114 |
| 2013/0272808 A1 * | 10/2013 | Cohen | B23B 27/143 407/116 |
| 2015/0375303 A1 * | 12/2015 | Fujii | B23B 27/143 82/1.11 |

FOREIGN PATENT DOCUMENTS

| | | | |
|---|---|---|---|
| EP | 567899 A1 * | 11/1993 | B23B 27/14 |
| EP | 1852200 A2 * | 11/2007 | B23B 27/143 |
| JP | 06055312 A * | 3/1994 | B23B 27/22 |
| JP | H0655312 | 3/1994 | |
| JP | 06190612 A * | 7/1994 | |
| JP | 2004-106150 | 4/2004 | |
| JP | 2004106150 A * | 4/2004 | B23B 27/22 |
| JP | 2004216510 A * | 8/2004 | B23B 27/22 |
| WO | WO 9425208 A1 * | 11/1994 | B23B 27/143 |
| WO | WO 9532071 A1 * | 11/1995 | B23B 27/141 |
| WO | WO 2014192798 A1 * | 12/2014 | B23B 27/143 |
| WO | WO 2015081353 A1 * | 6/2015 | B23B 27/1618 |

* cited by examiner

CUTTING INSERT WITH CHIP-CONTROL ARRANGEMENT

FIELD OF THE INVENTION

The subject matter of the present application relates to a chip-control arrangement for a cutting insert. Such chip-control arrangement can be formed on an insert configured for, inter alia, turning operations. In particular, such chip-control arrangement can be formed on an insert configured for semi-finish and finish turning operations.

BACKGROUND OF THE INVENTION

Cutting inserts can be provided with a chip-control arrangement for controlling the flow of and/or controlling the shape and size of the swarf and debris resulting from metalworking operations.

Such chip-control arrangements usually consist of recesses and/or projections located near a cutting edge of the insert. Upon encountering the recesses and/or projections, metal chips can be created with specific shapes and can then be evacuated therefrom.

In chip-control arrangements with a projection, the projection can extend across the corner bisector. Various chip-control arrangements are disclosed in U.S. Pat. Nos. 5,743,681 7,182,555 and U.S. 2013/0272808.

It is an object of the subject matter of the present application to provide an improved chip-control arrangement for a cutting insert.

It is a further object of the subject matter of the present application to provide a chip-control arrangement that prolongs the life of a cutting insert.

SUMMARY OF THE INVENTION

In accordance with the subject matter of the present application there is provided a cutting insert comprising:
 opposing top and bottom end faces and first and second side surfaces extending therebetween;
 a corner surface connecting the first and second side surfaces and intersecting the top end face to form a corner cutting edge;
 a cutting corner, located on the top end face adjacent the corner cutting edge, the cutting corner having a bisector; and
 a chip-control arrangement located at the cutting corner and comprising:
  a projection protruding from the top end face and extending longitudinally in a direction transverse to, and to opposites sides of, the bisector, the projection comprising two opposing projection extremities and an elongated surface extending therebetween, the elongated surface inclining upwardly from the top end face in a direction away from the corner cutting edge; and
  a protrusion protruding from the top end face and comprising a protrusion ridge that extends longitudinally from the elongated surface in a direction towards the corner cutting edge; wherein
  the protrusion is lower than the projection, in relation to the upward direction.

It is understood that the above-said is a summary, and that features described hereinafter may be applicable in any combination to the subject matter of the present application, for example, any of the following features may be applicable to the cutting insert or chip-control arrangement:

In a top view of the cutting corner, the projection can extend longitudinally in a direction perpendicular to the bisector.

The projection and the protrusion can be mirror symmetrical about the bisector.

The cutting insert can further comprise first and second side cutting edges formed at the intersection of the top end face and the first and second side surfaces respectively, forming a continuous cutting edge with the corner cutting edge, and a land, extending along the cutting edge on the top end face.

In a top view of the cutting corner, one projection extremity can be located at a mid-region between the first side cutting edge and the bisector. The other projection extremity can be located at a mid-region between the second side cutting edge and the bisector.

The protrusion may not extend to the land.

The elongated surface can further comprise an elongated surface uppermost area which, in relation to an upward direction, is higher than a corner cutting edge point on the corner cutting edge.

The projection can further comprise a declining surface extending between the two projection extremities and declining from the elongated surface in a direction away from the corner cutting edge.

The cutting insert can further comprise a central island comprising a raised island upper surface at least partially surrounded by an island inclined surface, the central island having an elongated nose portion directed towards the corner cutting edge. The declining surface can extend to the island inclined surface.

The chip-control arrangement can further comprise an elongated rib extending from the declining surface to the raised island upper surface.

In a top view of the cutting corner, the rib can extend along the bisector.

In a cross-sectional view taken in a plane perpendicular to, and through, a longitudinal extension of the projection, the elongated surface can comprise an upwardly extending convex portion.

In a cross-sectional view taken in a plane along, and through, a longitudinal extension of the projection, the elongated surface can comprise a central linear portion.

In a cross-sectional view taken in a plane along, and through, a longitudinal extension of the projection, each of the projection extremities can comprise a respective extremity convex portion.

The elongated surface can further comprise an elongated surface uppermost area which, in relation to an upward direction, is lower than a lowermost central island point on the raised island upper surface.

The protrusion can further comprise two protrusion side surfaces with the protrusion ridge extending therebetween. In a cross-sectional view taken in a plane perpendicular to, and through, a longitudinal extension of the protrusion ridge, each of the two protrusion side surfaces can comprise a respective protrusion concave portion.

In a top view of the cutting corner, the protrusion ridge can extend along the bisector.

The projection has a projection length, as measured in a first direction parallel to a longitudinal extension of the projection. The protrusion has protrusion length, as measured in a second direction parallel to a longitudinal extension of the protrusion ridge), the first and second directions being perpendicular to one another. The projection length can be greater than the protrusion length.

The cutting insert can be a positive cutting insert.

In a top view of the cutting corner, the projection can have a maximum projection width, as measured in a direction perpendicular to a longitudinal extension of the projection, disposed at each projection extremity.

In a cross-sectional view taken in a plane along, and through, a longitudinal extension of the protrusion ridge, the protrusion ridge can be concavely curved.

BRIEF DESCRIPTION OF THE FIGURES

For a better understanding of the present application and to show how the same may be carried out in practice, reference will now be made to the accompanying drawings, in which.

Figure 1:
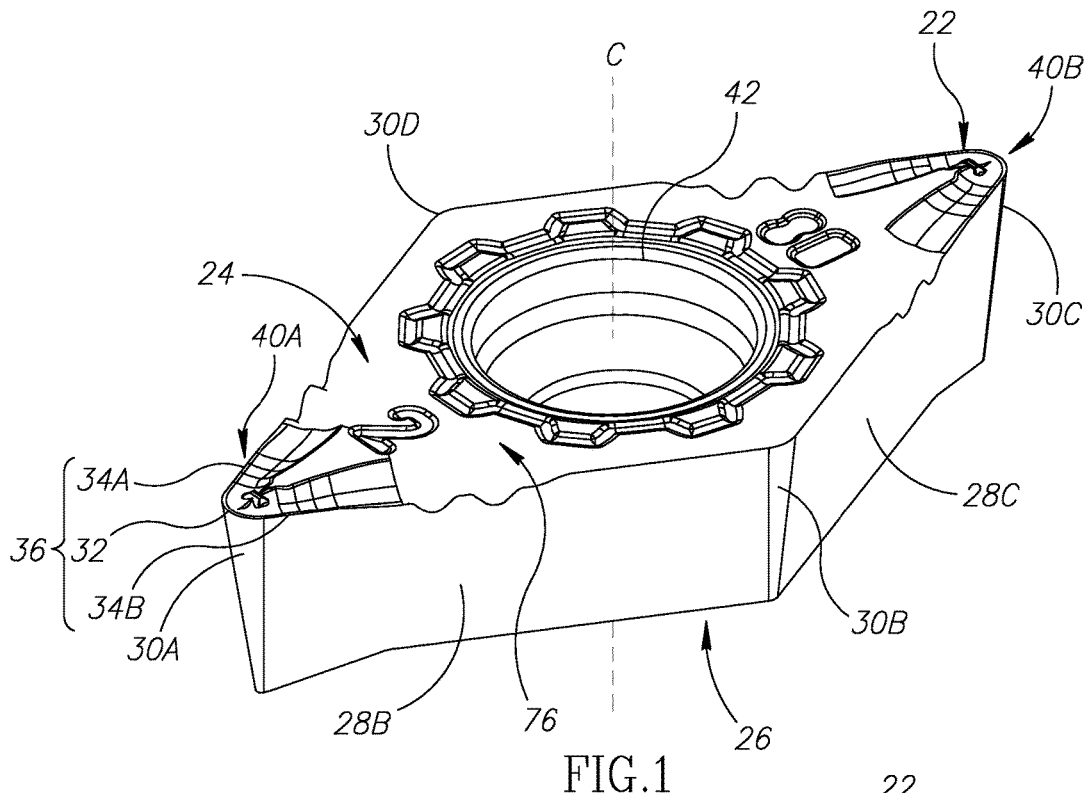
FIG. 1 is a perspective view of a cutting insert.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
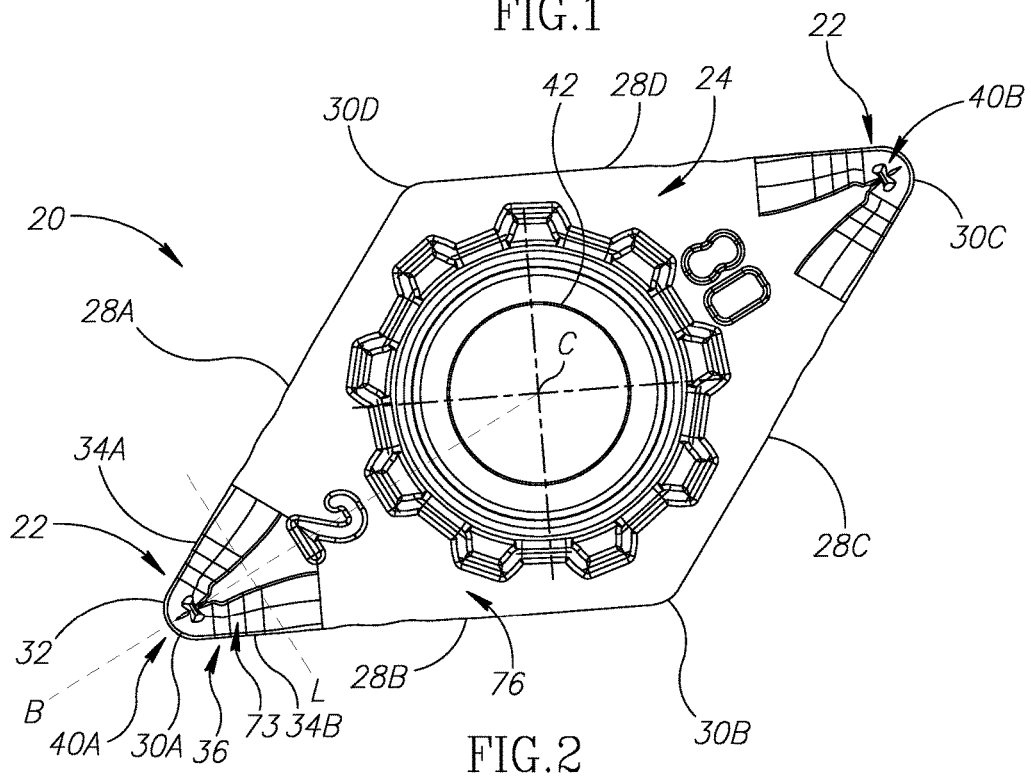
FIG. 2 is a top view of the cutting insert in FIG. 1.

Attention is first drawn to FIGS. 1 and 2, showing a cutting insert 20, which can be typically made from cemented carbide, with a chip-control arrangement 22. The chip-control arrangement 22 on the cutting insert 20 is suitable for semi-finishing and finishing in, inter alia, turning operations. In theory, the chip-control arrangement 22 may be particularly suitable for using on work-pieces made of steel, but it is also suitable for using on work-pieces made of other materials.

Figure 6:
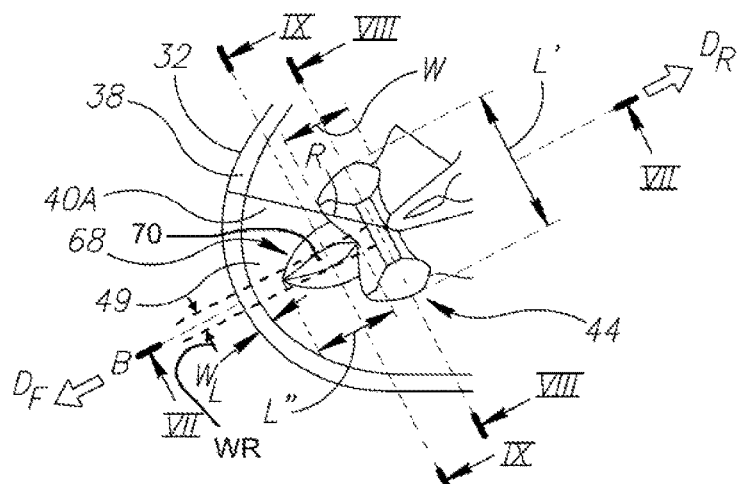
FIG. 6 is a detail in FIG. 5.

The cutting insert 20 includes opposing top and bottom end faces 24, 26 and first and second side surfaces 28A, 28B that both extend between the top and bottom end faces 24, 26. The first and second side surfaces 28A, 28B are connected by a corner surface 30A. A corner cutting edge 32 is formed at the intersection of the top end face 24 and the corner surface 30A. In this non-limiting example, as shown in FIG. 6, the corner cutting edge 32 is convexly curved. In particular, the corner cutting edge 32 has a fixed cutting edge radius R. First and second side cutting edges 34A, 34B are formed at the intersection of the top end face 24 and the first and second side surfaces 28A, 28B respectively. The corner cutting edge 32 extends between the first and second side surfaces 28A, 28B, thereby forming a continuous cutting edge 36. In accordance with some embodiments of the subject matter of the present application, a land 38 can extend along the cutting edge 36 on the top end face 24. The land 38 can have a fixed land width $W_L$. The purpose of the land 38 is to strengthen the cutting edge 36.

The cutting insert 20 includes a cutting corner 40A located on the top end face 24 adjacent the corner cutting edge 32. The cutting corner 40A has a bisector B. The bisector B defines forward and rearward directions $D_F$, $D_R$ (see FIG. 5). It is understood from the figures that the forward direction $D_F$ is in an "outward" direction of the insert (away from the insert center), while the rearward direction $D_R$ is in an "inward" direction of the insert (towards the insert center).

In this non-limiting example, as shown in a top view of the cutting insert 20 (FIG. 2), the cutting insert 20 further includes third and fourth side surfaces 28C, 28D, that extend between the top and bottom end faces 24, 26, to form a parallelogram shape and, more precisely, a rhomboid having exactly two cutting corners 40A, 40B on the top end face 24. It is understood that a top view of the cutting insert 20 is a view taken along the central axis C. Adjacent pairs of the first, second, third and fourth side surfaces 28A, 28B, 28C, 28D each have a respective corner surface 30A, 30B, 30C, 30D connecting the members of each said adjacent pair. The corners formed between the second and third side surfaces 28B, 28C and the first and fourth side surfaces 28A, 28D may not be cutting corners. It is understood, that the chip-control arrangement 22 described hereinafter could be formed on cutting inserts that include a different number of sides or, in such a view, other shapes that include at least one cutting corner.

It is also noticed, that, in this non-limiting example, the cutting insert 20 is formed with a clamping hole 42 located in the middle thereof (see FIG. 2, for example) which opens out to the top and bottom end faces 24, 26 and is configured for receiving a clamping member (not shown) therethrough. It is understood that alternative methods of fastening an insert to an insert holder could be employed, for example clamping jaws, and therefore such inserts could be devoid of, or include a differently shaped, clamping hole.

Figure 3:
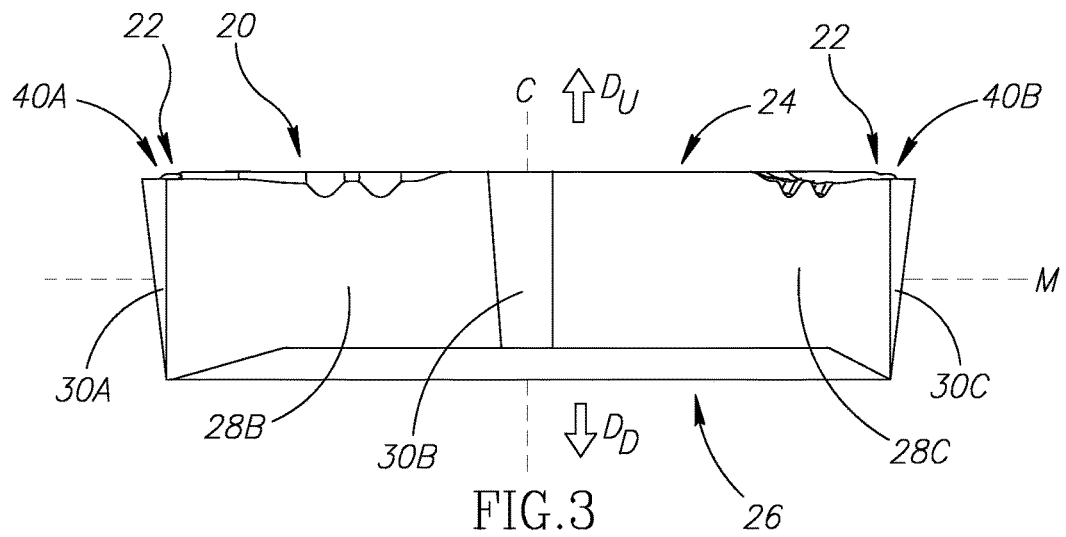
FIG. 3 is a side view of the cutting insert in FIGS. 1 and 2.

A central axis C extends through the top and bottom end faces 24, 26. As shown in FIG. 3, the central axis C defines upward and downward directions $D_U$, $D_D$. In this non-limiting example, the central axis C is coaxial with the clamping hole 42, and each of the first, second, third and fourth side surfaces 28A, 28B, 28C, 28D can be inclined with respect to the central axis C. In particular, the each of the first, second, third and fourth side surfaces 28A, 28B, 28C, 28D can converge towards the central axis C in the downward direction $D_D$. References made hereinafter to height are measurable in a direction parallel to the central axis C.

In this non-limiting example, the cutting insert 20 is single-sided with two opposite cutting corners 40A, 40B thereof being formed with an identical chip-control arrangement 22. The cutting insert 20 has two-fold rotational symmetry about the central axis C. The cutting insert 20 may not be mirror symmetrical about a median plane M that is perpendicular to the central axis C and that extends midway between the top and bottom end faces 24, 26. It is understood that the cutting insert 20 in accordance with the subject matter of the present application could include one or more cutting corners with such chip-control arrangement 22 and other cutting corners which could be devoid of any chip-control arrangement or formed with a different chip-control arrangement. If, for example, the cutting insert 20 has only one chip-control arrangement 22 and, the cutting insert 20 would not have two-fold rotational symmetry about the central axis C.

Figure 4:
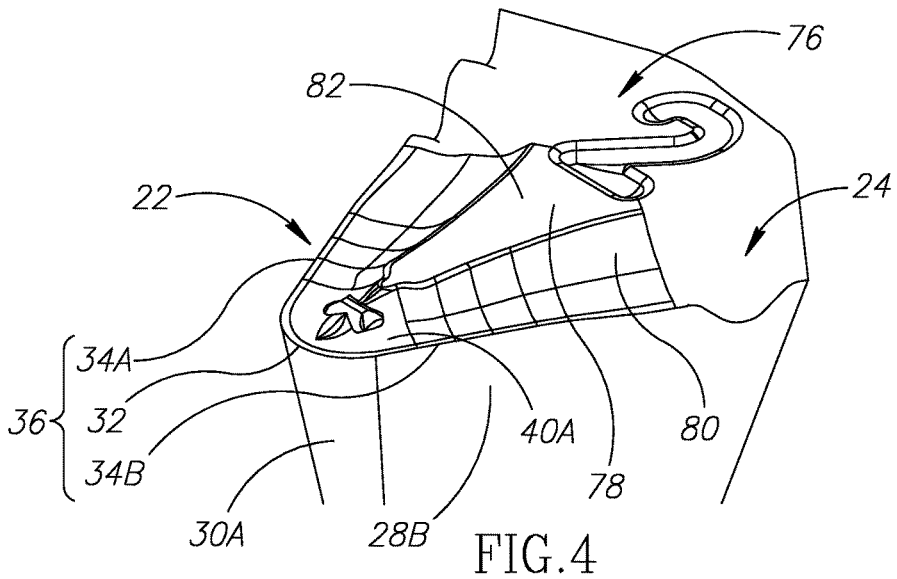
FIG. 4 is a perspective view of a cutting corner.
Figure 5:
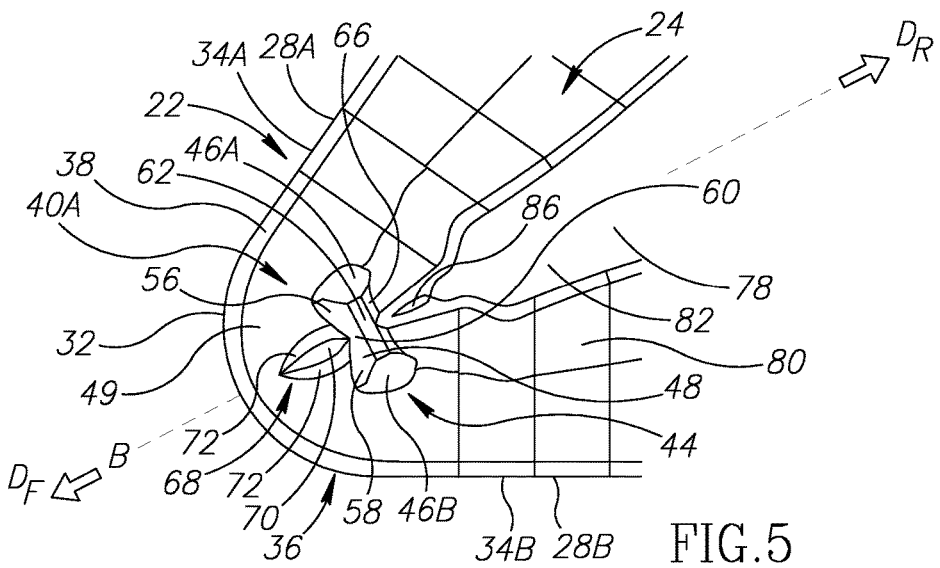
FIG. 5 is a top view of the cutting corner.
Figure 7:
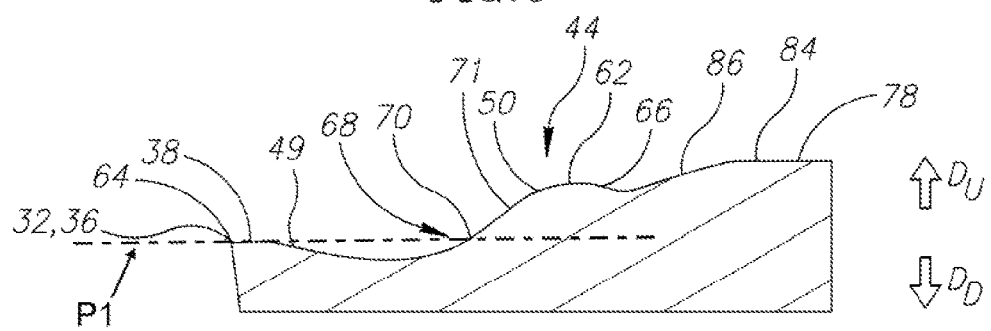
FIG. 7 is a cross sectional view taken along line VII-VII, which extends along a bisector B, in FIG. 6.

Referring now to FIGS. 4-6, the chip-control arrangement 22 is located at the cutting corner 40A and includes a projection 44. The projection 44 protrudes from the top end face 24 and extends longitudinally in a direction transverse to, and to opposites sides of, the bisector B. The projection 44 includes two opposing projection extremities 46A, 46B and an elongated surface 48 that extends between the two opposing projection extremities 46A, 46B. The two projection extremities 46A, 46B are the most spaced-apart regions or ends of the projection 44. The elongated surface 48 inclines upwardly from the top end face 24 in a direction away from the corner cutting edge 32. As seen in a top view of the cutting corner 40A (i.e. FIG. 5), in accordance with some embodiments of the subject matter of the present application, as measured in a direction perpendicular to the bisector B, one projection extremity 46A can be located at a mid-region between the first side cutting edge 34A and the bisector B. The other projection extremity 46B can be located at a mid-region between the second side cutting edge 34B and the bisector B. Thus, the projection 44 may be spaced apart from the land 38. As seen in FIG. 6, the projection 44 can have a maximum projection width W, as measured in a direction perpendicular to a longitudinal extension of the projection 44, at each projection extremity 46A, 46B. The top end face 24 can include a chip deflecting surface 49 that extends between the land 38 and the projection 44. As seen in FIG. 7, the chip deflecting surface 49 can extend downwardly from the land 38. The projection 44 can include a declining surface 66 that extends between the projection extremities 46A, 46B and declines from the elongated surface 48 in a direction away from the corner cutting edge 32.

In accordance with some embodiments of the subject matter of the present application, in a top view of the cutting corner 40A, the projection 44 can extend longitudinally in a direction perpendicular to the bisector B. In such a configuration, the elongated surface 48 inclines upwardly from the top end face 24 in a direction away from the corner cutting edge 32 and parallel to the bisector B. The projection 44, and thus the elongated surface 48 can be mirror symmetrical about the bisector B.

Figure 8:
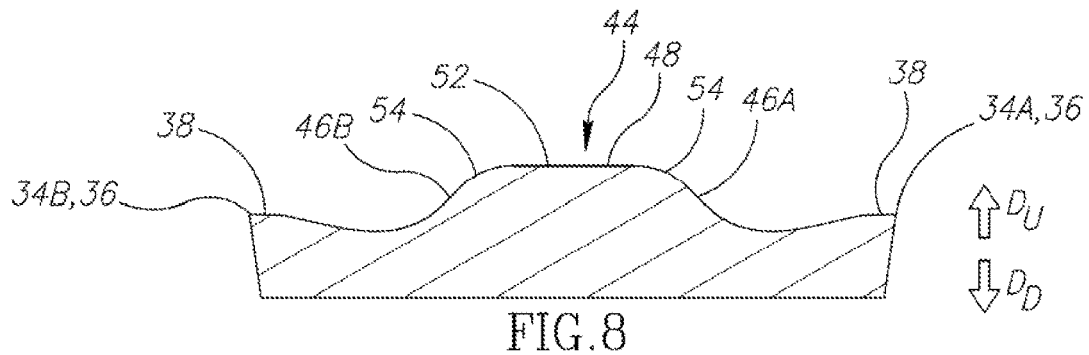
FIG. 8 is a cross sectional view taken along line VIII-VIII in FIG. 6.
Figure 9:
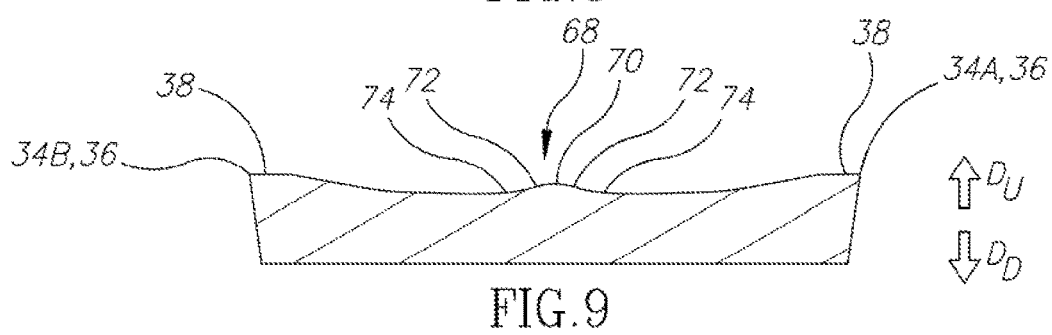
FIG. 9 is a cross section view taken along line IX-IX in FIG. 6.

Referring again to FIG. 7, further in accordance with some embodiments of the subject matter of the present application, in a cross-sectional view taken in a plane perpendicular to, and through, a longitudinal extension of the projection 44, the elongated surface 48 can include an upwardly extending convex portion 50. Referring now to FIG. 8, in a cross-sectional view taken in a plane along, and through, a longitudinal extension of the projection 44, the elongated surface 48 can include a central linear portion 52. Moreover, in the same view, each of the projection extremities 46A, 46B can include a respective extremity convex portion 54.

In accordance with some embodiments of the subject matter of the present application, the elongated surface 48 can include first and second extremities 56, 58 with an elongated middle portion 60 that extends therebetween. The first and second extremities 56, 58 are the most spaced-apart regions or ends of the elongated surface 48. The upwardly extending convex portion 50 can be located on the elongated middle portion 60 of the elongated surface 48. The elongated surface 48 can further include an elongated surface uppermost area 62 that is the portion of the elongated surface 48 furthest from the top end face 24 in the upward direction $D_U$. The elongated surface uppermost area 62, in relation to an upward direction $D_U$, can be higher than a corner cutting edge point 64 on the corner cutting edge 32.

The chip-control arrangement includes a protrusion 68 that protrudes from the top end face 24. The protrusion 68 includes a protrusion ridge 70 that extends longitudinally from the elongated surface 48 in a direction towards the corner cutting edge 32. In any cross-sectional view taken in a plane perpendicular to, and through, a longitudinal extension of the protrusion ridge 70, the protrusion ridge 70 forms a highest portion of the protrusion 68, in relation to an upward direction $D_u$. In accordance with some embodiments of the subject matter of the present application, the protrusion ridge 70 can be an edge. In a cross-sectional view taken in a plane along, and through, a longitudinal extension of the protrusion ridge 70 (i.e. FIG. 7), the protrusion ridge 70 can be concavely curved and is intersected by an imaginary cutting plane P1 that is parallel to the median plane M and intersects the corner cutting edge 32. The protrusion 68 can include two protrusion side surfaces 72. The protrusion ridge 70 extends between the two protrusion side surfaces 72. The protrusion ridge 70 can extend from the elongated middle portion 60 of the projection 44 in a direction towards the corner cutting edge 32. In this non-limiting example, a rearmost portion of the protrusion ridge 70 forms a protrusion ridge uppermost area 71 that can be adjacent the upwardly extending convex portion 50 in a direction towards the corner cutting edge 32, where the protrusion ridge uppermost area 71 is the portion of the protrusion ridge 70 furthest from the top end face 24 in relation to the upward direction $D_u$. The protrusion 68 can extend to the chip deflecting surface 49. That is to say, the protrusion 68, and thus the protrusion ridge 70, may not extend to the land 38. In a top view of the cutting corner 40A, the protrusion ridge 70 can extend along the bisector B. In a cross-sectional view taken in a plane perpendicular to, and through, a longitudinal extension of the protrusion ridge 70, each of the two protrusion side surfaces 72 can include a respective protrusion concave portion 74. The protrusion 68 can be mirror symmetrical about the bisector B.

As seen in FIG. 2, a corner portion 73 of the top end face 24 is delimited by the first and second side surfaces 28A, 28B, the corner surface 30A and a delimiting line L that extends perpendicular to the bisector B and intersects the bisector B at a point one fifth of the way from the corner cutting edge 32 to the central axis C. The projection 44 and the protrusion 68 can be located in the corner portion 73.

Referring to FIG. 6, in a top view of the cutting corner 40A, the projection 44 has a projection length L', as measured in a first direction along the projection 44 and transverse to the bisector B. In a top view of the cutting corner 40A, the protrusion 68 has protrusion length L" as measured in a second direction along the bisector B and the protrusion ridge 70, the second direction being perpendicular to the first direction. The projection length L' can be greater than the protrusion length L". The protrusion ridge 70 has maximum ridge length LR taken in the first direction along the bisector B and a maximum ridge width WR taken in the second direction transverse to the bisection B. Thus, as seen in FIG.

6, the protrusion ridge 70 is longer in a first direction along the bisector B than in a second direction perpendicular to the bisector B.

Referring to FIG. 7, the protrusion ridge uppermost area 71 is lower than the elongated surface uppermost area 62, in relation to an upward direction $D_U$. Thus, the protrusion 68 is lower than the projection 44, in relation to an upward direction $D_U$. Additionally, the elongated surface uppermost area 62 is spaced apart from the protrusion ridge uppermost area 71 along the bisector B, by the elongated middle portion 60 of the projection 44.

The configuration of the projection 44 and the protrusion 68 is designed for creating of chips with a size and shape that can be beneficial for their removal from the cutting area. It is noted, that, in this non-limiting example, the chip-control arrangement 22 includes exactly one projection 44 and one protrusion 68.

In accordance with some embodiments of the subject matter of the present application the cutting insert 20 can include a central island 76. The central island 76 can include a raised island upper surface 78 that can be at least partially surrounded by an island inclined surface 80. The island inclined surface 80 extends upwardly towards the raised island upper surface 78. The central island 76 can include an elongated nose portion 82 directed towards the cutting corner 40A. The elongated surface uppermost area 62, in relation to an upward direction $D_U$, can be lower than a lowermost central island point 84 on a raised island upper surface 78 of a central island 76.

In accordance with some embodiments of the subject matter of the present application the declining surface 66 can extend to the island inclined surface 80. The chip-control arrangement 22 can include an elongated rib 86 that extends from the declining surface 66 to the raised island upper surface 78. In a top view of the cutting corner 40A, the rib 86 can extend along the bisector B.

The chip-control arrangement 22 can be mirror symmetrical about the bisector B. A possible advantage of symmetry about the bisector B, is that the cutting insert 20 can have equal chip-control qualities regardless of whether the cutting insert 20 is used in a left or right handed configuration.

It should be noted that a feature of subject matter of the present application is that the chip-control arrangement 22 produces chips having a shape and size beneficial for removal from the cutting area. This reduces the possibility of the cutting edge 36 of the cutting insert 20 being damaged by non-removal of chips, and also prolongs the life of a cutting insert 20. Such application may be achievable with the above-described construction, even without additional features or constructions components.

It should further be noted that the chip-control arrangement 22 is found to be particularly effective when the cutting insert 20 has a 'positive' cutting insert geometry. That is to say, relief surfaces, located on the first and second side surfaces 28A, 28B, are inclined inwardly in a direction away from the top end face 24.

Although the subject matter of the present application has been described to a certain degree of particularity, it should be understood that various alterations and modifications could be made without departing from the spirit or scope of the subject matter of the application as hereinafter claimed. For example, while example ranges, values and element-locations described above were found to be an advantageous configuration for turning inserts, particularly for semi-finishing and finishing, other ranges, values and element-locations for different types of operations and/or workpiece materials are also feasible.

What is claimed is:

1. A cutting insert (20) comprising:
   opposing top and bottom end faces (24, 26) and first and second side surfaces (28A, 28B) extending therebetween;
   a central axis (C) extending through the top and bottom end surfaces (24, 26) and defining an upward direction ($D_U$) and a downward direction ($D_D$) of the insert;
   a corner surface (30A) connecting the first and second side surfaces (28A, 28B) and intersecting the top end face (24) to form a corner cutting edge (32);
   a cutting corner (40A), located on the top end face (24) adjacent the corner cutting edge (32), the cutting corner (40A) having a bisector (B); and
   a chip-control arrangement (22) located at the cutting corner (40A) and comprising:
      a projection (44) protruding from the top end face (24) and extending longitudinally in a direction transverse to, and to opposites sides of, the bisector (B), the projection (44) comprising two opposing projection extremities (46A, 46B) and an elongated surface (48) extending therebetween, the elongated surface (48) inclining upwardly from the top end face (24) in a direction away from the corner cutting edge (32); and
      a protrusion (68) protruding from the top end face (24) and comprising a protrusion ridge (70) which, in a top view of the cutting corner, is longer in a second direction along the bisector (B) than in a first direction perpendicular to the bisector (B) and extends longitudinally lengthwise along the bisector (B), from the elongated surface (48) in a direction towards the corner cutting edge (32); wherein
   in a top view of the cutting corner (40A):
      the projection (44) has a projection length (L') measured in the first direction perpendicular to the bisector (B);
      the projection (44) has a maximum projection width (W) measured in the second direction along the bisector (B), and
      the maximum projection width (W) is smaller than the projection length (L');
   the protrusion (68) is lower than the projection (44), in relation to the upward direction ($D_U$); and
   in a cross-sectional view taken in a plane along, and through, a longitudinal extension of the protrusion ridge (70), the protrusion ridge (70) is concavely curved.

2. The cutting insert (20) according to claim 1, wherein, in a top view of the cutting corner (40A), the projection (44) extends longitudinally in a direction perpendicular to the bisector (B).

3. The cutting insert (20) according to claim 1, wherein the projection (44) and the protrusion (68) are mirror symmetrical about the bisector (B).

4. The cutting insert (20) according to claim 1, further comprising first and second side cutting edges (34A, 34B) formed at the intersection of the top end face (24) and the first and second side surfaces (28A, 28B) respectively, forming a continuous cutting edge (36) with the corner cutting edge (32), and a land (38), extending along the cutting edge (36) on the top end face (24).

5. The cutting insert (20) according to claim 4, wherein in a top view of the cutting corner (40A):
   one projection extremity (46A) is located between the first side cutting edge (34A) and the bisector (B); and the other projection extremity (46B) is located between the second side cutting edge (34B) and the bisector (B).

6. The cutting insert (20) according to claim 4, wherein the protrusion (68) does not extend to the land (38).

7. The cutting insert (20) according to claim 1, wherein the elongated surface (48) further comprises an elongated surface uppermost area (62) which, in relation to the upward direction ($D_U$), is higher than a corner cutting edge point (64) on the corner cutting edge (32).

8. The cutting insert (20) according to claim 1, wherein the projection (44) further comprises a declining surface (66) extending between the two projection extremities (46A, 46B) and declining from the elongated surface (48) in a direction away from the corner cutting edge (32).

9. The cutting insert (20) according to claim 8, further comprising a central island (76) comprising:
a raised island upper surface (78) at least partially surrounded by an island inclined surface (80), the central island (76) having an elongated nose portion (82) directed towards the corner cutting edge (32); wherein the declining surface (66) extends to the island inclined surface (80).

10. The cutting insert (20) according to claim 9, wherein: the chip-control arrangement further comprises an elongated rib (86) extending from the declining surface (66) to the raised island upper surface (78).

11. The cutting insert (20) according to claim 10, wherein in a top view of the cutting corner (40A), the elongated rib (86) extends along the bisector (B).

12. A cutting insert (20) comprising:
opposing top and bottom end faces (24, 26) and first and second side surfaces (28A, 28B) extending therebetween;
a central axis (C) extending through the top and bottom end surfaces (24, 26) and defining an upward direction ($D_U$) and a downward direction ($D_D$) of the insert;
a corner surface (30A) connecting the first and second side surfaces (28A, 28B) and intersecting the top end face (24) to form a corner cutting edge (32);
a cutting corner (40A), located on the top end face (24) adjacent the corner cutting edge (32), the cutting corner (40A) having a bisector (B); and
a chip-control arrangement (22) located at the cutting corner (40A) and comprising:
a projection (44) protruding from the top end face (24) and extending longitudinally in a direction transverse to, and to opposites sides of, the bisector (B), the projection (44) comprising two opposing projection extremities (46A, 46B) and an elongated surface (48) extending therebetween, the elongated surface (48) inclining upwardly from the top end face (24) in a direction away from the corner cutting edge (32); and
a protrusion (68) protruding from the top end face (24) and comprising a protrusion ridge (70) which, in a top view of the cutting corner, is longer in a second direction along the bisector (B) than in a first direction perpendicular to the bisector (B) and extends longitudinally lengthwise along the bisector (B), from the elongated surface (48) in a direction towards the corner cutting edge (32); wherein
the protrusion (68) is lower than the projection (44), in relation to the upward direction ($D_U$);
in a cross-sectional view taken in a plane along, and through, a longitudinal extension of the protrusion ridge (70), the protrusion ridge (70) is concavely curved; and
in a cross-sectional view taken in a plane perpendicular to, and through, a longitudinal extension of the projection (44), the elongated surface (48) comprises an upwardly extending convex portion (50).

13. The cutting insert (20) according to claim 1, wherein, in a cross-sectional view taken in a plane along, and through, a longitudinal extension of the projection (44), the elongated surface (48) comprises a central linear portion (52).

14. A cutting insert (20) comprising:
opposing top and bottom end faces (24, 26) and first and second side surfaces (28A, 28B) extending therebetween;
a central axis (C) extending through the top and bottom end surfaces (24, 26) and defining an upward direction ($D_U$) and a downward direction ($2_2$) of the insert;
a corner surface (30A) connecting the first and second side surfaces (28A, 28B) and intersecting the top end face (24) to form a corner cutting edge (32);
a cutting corner (40A), located on the top end face (24) adjacent the corner cutting edge (32), the cutting corner (40A) having a bisector (B); and
a chip-control arrangement (22) located at the cutting corner (40A) and comprising:
a projection (44) protruding from the top end face (24) and extending longitudinally in a direction transverse to, and to opposites sides of, the bisector (B), the projection (44) comprising two opposing projection extremities (46A, 46B) and an elongated surface (48) extending therebetween, the elongated surface (48) inclining upwardly from the top end face (24) in a direction away from the corner cutting edge (32); and
a protrusion (68) protruding from the top end face (24) and comprising a protrusion ridge (70) which, in a top view of the cutting corner, is longer in a second direction along the bisector (B) than in a first direction perpendicular to the bisector (B) and extends longitudinally lengthwise along the bisector (B), from the elongated surface (48) in a direction towards the corner cutting edge (32); wherein
the protrusion (68) is lower than the projection (44), in relation to the upward direction ($D_U$);
in a cross-sectional view taken in a plane along, and through, a longitudinal extension of the protrusion ridge (70), the protrusion ridge (70) is concavely curved; and
in a cross-sectional view taken in a plane along, and through, a longitudinal extension of the projection (44), each of the projection extremities (46A, 46B) comprises a respective extremity convex portion (54).

15. A cutting insert (20) comprising:
opposing top and bottom end faces (24, 26) and first and second side surfaces (28A, 28B) extending therebetween;
a central axis (C) extending through the top and bottom end surfaces (24, 26) and defining an upward direction ($D_U$) and a downward direction ($D_D$) of the insert;
a corner surface (30A) connecting the first and second side surfaces (28A, 28B) and intersecting the top end face (24) to form a corner cutting edge (32);
a cutting corner (40A), located on the top end face (24) adjacent the corner cutting edge (32), the cutting corner (40A) having a bisector (B);
a chip-control arrangement (22) located at the cutting corner (40A) and comprising:

a projection (44) protruding from the top end face (24) and extending longitudinally in a direction transverse to, and to opposites sides of, the bisector (B), the projection (44) comprising two opposing projection extremities (46A, 46B) and an elongated surface (48) extending therebetween, the elongated surface (48) inclining upwardly from the top end face (24) in a direction away from the corner cutting edge (32); and a protrusion (68) protruding from the top end face (24) and comprising a protrusion ridge (70) which, in a top view of the cutting corner, is longer in a second direction along the bisector (B) than in a first direction perpendicular to the bisector (B) and extends longitudinally lengthwise along the bisector (B), from the elongated surface (48) in a direction towards the corner cutting edge (32); wherein the protrusion (68) is lower than the projection (44), in relation to the upward direction ($(D_U)$;

in a cross-sectional view taken in a plane along, and through, a longitudinal extension of the protrusion ridge (70), the protrusion ridge (70) is concavely curved; and a central island (76) comprising:

a raised island upper surface (78) at least partially surrounded by an island inclined surface (80), the central island (76) having an elongated nose portion (82) directed towards the corner cutting edge (32); wherein the elongated surface (48) further comprises an elongated surface uppermost area (62) which, in relation to the upward direction ($D_U$), is lower than a lowermost central island point (84) on the raised island upper surface (78).

16. A cutting insert (20) comprising:

opposing top and bottom end faces (24, 26) and first and second side surfaces (28A, 28B) extending therebetween;

a central axis (C) extending through the top and bottom end surfaces (24, 26) and defining an upward direction ($D_U$) and a downward direction ($D_D$) of the insert;

a corner surface (30A) connecting the first and second side surfaces (28A, 28B) and intersecting the top end face (24) to form a corner cutting edge (32);

a cutting corner (40A), located on the top end face (24) adjacent the corner cutting edge (32), the cutting corner (40A) having a bisector (B); and a chip-control arrangement (22) located at the cutting corner (40A) and comprising:

a projection (44) protruding from the top end face (24) and extending longitudinally in a direction transverse to, and to opposites sides of, the bisector (B), the projection (44) comprising two opposing projection extremities (46A, 46B) and an elongated surface (48) extending therebetween, the elongated surface (48) inclining upwardly from the top end face (24) in a direction away from the corner cutting edge (32); and a protrusion (68) protruding from the top end face (24) and comprising a protrusion ridge (70) which, in a top view of the cutting corner, is longer in a second direction along the bisector (B) than in a first direction perpendicular to the bisector (B) and extends longitudinally lengthwise along the bisector (B), from the elongated surface (48) in a direction towards the corner cutting edge (32); wherein the protrusion (68) is lower than the projection (44), in relation to the upward direction ($D_U$);

in a cross-sectional view taken in a plane along, and through, a longitudinal extension of the protrusion ridge (70), the protrusion ridge (70) is concavely curved;

the protrusion (68) further comprises two protrusion side surfaces (72) with the protrusion ridge (70) extending therebetween; and in a cross-sectional view taken in a plane perpendicular to, and through, a longitudinal extension of the protrusion ridge (70), each of the two protrusion side surfaces (72) comprises a respective protrusion concave portion (74).

17. The cutting insert (20) according to claim 16, wherein, in a top view of the cutting corner (40A), the protrusion ridge (70) extends along the bisector (B).

18. The cutting insert (20) according to claim 1, wherein in a top view of the cutting corner (40A):

the protrusion (68) has a protrusion length (L") measured in the second direction along the bisector (B); and the projection length (L') is greater than the protrusion length (L").

19. The cutting insert (20) according to claim 1, wherein the cutting insert (20) is a positive cutting insert.

20. The cutting insert (20) according to claim 1, wherein the maximum projection width (W) corresponds to a maximum width of the projection extremities (46A, 46B) measured in the second direction along the bisector (B).

21. The cutting insert (20) according to claim 1, further comprising:

a median plane (M) that is perpendicular to the central axis (C) and extends midway between the top and bottom end faces (24, 26); and wherein:

the concavely curved protrusion ridge (70) is intersected by an imaginary cutting plane (P1) which is parallel to the median plane (M) and intersects the corner cutting edge (32).

* * * * *